(12) United States Patent
Conrad et al.

(10) Patent No.: US 7,100,747 B1
(45) Date of Patent: Sep. 5, 2006

(54) INTEGRAL MOTOR BRAKE MANUAL RELEASE MECHANISM

(75) Inventors: David W. Conrad, Taylors, SC (US); Patrick N. Cromer, Anderson, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 98 days.

(21) Appl. No.: 09/836,976

(22) Filed: Apr. 18, 2001

(51) Int. Cl.
*B60L 7/00* (2006.01)
(52) U.S. Cl. .................. 188/162; 310/77; 188/72.9
(58) Field of Classification Search .......... 310/75, 310/77, 93; 188/162, 171, 71.5, 73.1, 72.7, 188/161, 72.9
See application file for complete search history.

(56) References Cited

U.S. PATENT DOCUMENTS

| | | | | |
|---|---|---|---|---|
| 2,620,901 A * | 12/1952 | Stearns | ............ | 188/171 |
| 2,700,439 A * | 1/1955 | Hodgson | ............ | 188/171 |
| 2,939,551 A * | 6/1960 | Hansen | ............ | 188/171 |
| 3,095,068 A * | 6/1963 | Hansen | ............ | 188/171 |
| 4,130,188 A * | 12/1978 | Askew | ............ | 188/170 |
| 4,181,201 A * | 1/1980 | McCarthy | ............ | 188/171 |
| 4,224,832 A | 9/1980 | Prohaska et al. | ............ | 74/388 R |
| 4,466,303 A * | 8/1984 | Stober | ............ | 310/75 R |
| 4,476,965 A * | 10/1984 | Brown et al. | ............ | 188/171 |
| 4,570,758 A * | 2/1986 | Hendricks | ............ | 188/72.3 |
| 4,798,269 A * | 1/1989 | Lindner et al. | ............ | 188/171 |
| 4,820,946 A * | 4/1989 | Gutbrod | ............ | 188/71.7 |
| 4,828,077 A | 5/1989 | Stevens Jr. | ............ | 188/171 |
| 4,877,987 A * | 10/1989 | Flaig et al. | ............ | 310/77 |
| 5,130,592 A * | 7/1992 | Bitsch et al. | ............ | 310/77 |
| 5,186,287 A | 2/1993 | Lindner et al. | ............ | 188/171 |
| 5,424,622 A | 6/1995 | Keller et al. | ............ | 318/375 |
| 5,685,398 A * | 11/1997 | Marshall et al. | ............ | 188/72.3 |
| 5,697,473 A * | 12/1997 | Lindner | ............ | 188/72.3 |
| 6,119,825 A | 9/2000 | Nisley | ............ | 188/171 |
| 6,293,372 B1 * | 9/2001 | Lorenz et al. | ............ | 188/171 |

* cited by examiner

*Primary Examiner*—Robert A. Siconolfi
(74) *Attorney, Agent, or Firm*—Amin & Turocy, LLP; Alexander M. Gerasimow (57) ABSTRACT

The present invention relates to a manual brake release mechanism for an electromagnetic brake of an electronic motor. The manual brake release mechanism includes a cam and lever assembly operable to move an armature plate away from a friction disk, thereby, disengaging an electromagnetic brake. The cam and lever assembly is coupled to a field cup and provides an even pull over both sides of the armature plate.

27 Claims, 8 Drawing Sheets

INTEGRAL MOTOR BRAKE MANUAL RELEASE MECHANISM

TECHNICAL FIELD

The present invention generally relates to brake motors and in particular to a system and method of using manual brake release mechanism.

BACKGROUND OF THE INVENTION

Electromagnetic disk brakes are widely used in a variety of applications such as dynamic brakes for motor input shafts and/or output shafts and as static or "holding" brakes for motors and the like. A typical electromagnetic disk brake of this type includes a friction disk that is coupled with the shaft so as to be movable axially relative to the shaft but to be rotationally fixed relative to the shaft. In static braking applications, the brake is applied by compressing the friction disk between a stationary reaction plate and an axially movable armature plate to provide the desired holding action, and the brake is released by energizing the electromagnet to retract the armature plate to allow the friction disk to rotate freely. In dynamic braking applications, the brake is applied while the shaft is rotating, either by energizing an electromagnetic actuator to overcome the force of a compression spring or by de-energizing a normally energized actuator to permit the compression spring to apply the brake.

Electromagnetic disk brakes designed specifically for use with electric motors exhibit several disadvantages. Specifically, brakes of this type require a mounting plate for attaching the brake to the motor's end shield. This mounting plate necessarily increases the size and weight of the brake, limiting the brake's usefulness in some applications. Attachment of the brake to the motor end shield often requires modification of the existing end shield structure to accept the mounting plate, which tends to be labor intensive. Furthermore, when adding a brake to motors employing an internal fan for cooling, the brake is often mounted to the fan housing. Thus, the fan is positioned between the brake and the motor, preventing cooling to the brake. The heat produced by the brake during normal operation has a deleterious effect on the stopping and starting capacity of the brake. Additionally, the heat on the brake has a deleterious effect on the life of the brake and the motor.

Conventional manual brake release mechanisms typically have significant rotational play when the brake is actuated, leading to rattling and possibly to false actuation of indicator switches which are intended to be closed only upon manual brake release. Furthermore, the manual release mechanisms typically employed in electromagnetic brakes either utilize a two step process for providing an even pull on the armature plate or a one step process which only provides a pull on one side of the armature plate.

Therefore, there is an unmet need in the art to facilitate the integration of electric motors with electromagnetic brakes for decreasing cost, size and weight of the brake, while increasing efficiency of the brake.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for a system and method that facilitates integration of an electric motor with an electromagnetic brake. The integral brake motor of the present invention includes a cylindrical frame coupled to a circular end shield and an integral brake field cup and motor front end shield. The circular end shield is located at a drive end of the motor while the integral field cup and front end shield is located opposite the drive end of the motor. Within the frame is an electrical core for providing energy to the motor. The electrical core consists of a stator and a rotor and any additional circuitry and wiring required to operate the motor. The rotor is coupled to a rotor shaft. The rotor shaft is supported by bearing assemblies located in both the circular end shield and the integral field cup and front end shield. In addition to functioning as an end shield for the motor, the integral field cup and front end shield functions as a field cup for the brake component. The integral field cup and front end shield houses an electromagnetic coil. The electromagnetic coil is operable to electrically engage and/or disengage the brake. The present invention provides for a system and method to accomplish this process.

According to one aspect of the present invention, an internal fan is coupled to the shaft of the motor and is positioned outside of the brake components. The fan is operable to provide cooling air to the motor as well as the brake, thereby improving the bearing life and efficiency of the motor, as well as the starting and stopping capacity of the brake.

According to another aspect of the present invention, a manual brake release mechanism is coupled to the integral field cup and front end shield. The brake release mechanism includes a lever and cam combination for manual engagement and disengagement of the brake. The brake release mechanism employs a one step operation to provide an even pull on the armature plate, which disengages the brake.

To the accomplishment of the foregoing and related ends, the invention then, comprises the features hereinafter fully described and particularly pointed out in the claims. The following description and annexed drawings set forth in detail certain illustrative embodiments of the invention. These embodiments are indicative, however, of but a few of the various ways in which the principles of the invention may be employed. Other object, advantages and novel features of the invention will become apparent from the following detailed description of the invention when considered in conjunction with the drawings.

DETAILED DESCRIPTION OF THE INVENTION

The present invention will now be described with reference to the drawings. The present invention provides for a system and method that facilitates the integration of an electric motor with an electromagnetic brake. The electric motor is provided with an integrated field cup and front end shield. The present invention will also be described with reference to a methodology for employing the system.

Figure 1:
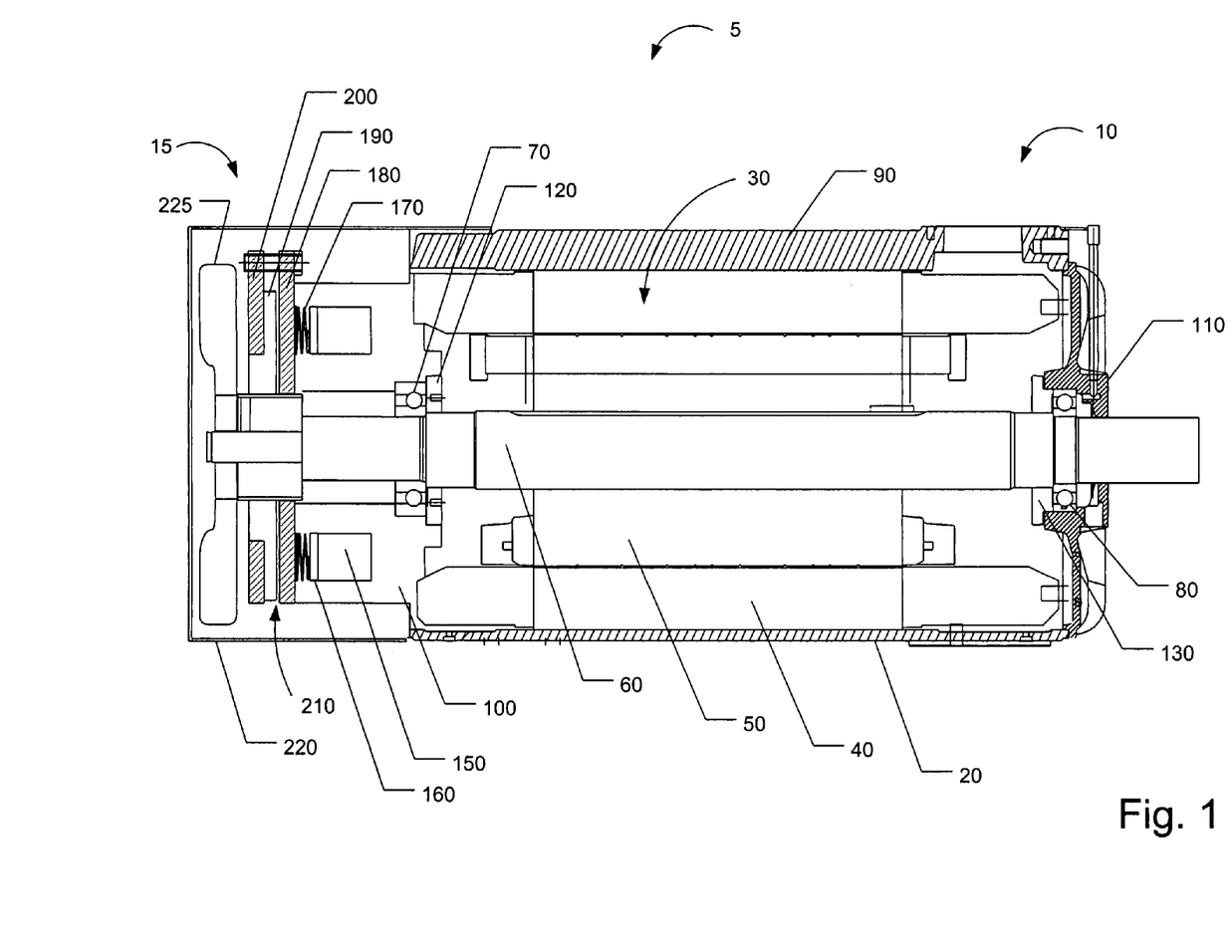
FIG. 1 illustrates a cross sectional view of an electric brake motor in accordance with one aspect of the present invention.

FIG. 1 illustrates an example of system 5 that integrates an electric motor 10 with an electromagnetic brake 15 in accordance with one aspect of the present invention. The electric motor 10 has a generally cylindrical frame 20 surrounding a motor core 30. The motor core 30 converts electrical energy to mechanical energy to drive external devices coupled to the motor 10. The motor core 30 is comprised of a stator 40, a rotor 50, and any other wiring and circuitry (not shown) for driving the motor 10. The rotor 50 is coupled to a shaft 60 extending through a central longitudinal axis of the motor 10. During operation of the motor 10, electrical current is provided to the stator windings, which generates a magnetic field that induces a current in the windings of the rotor. The induced current in the windings also generates a magnetic field in an opposite direction with respect to the magnetic field generated from the windings of the stator. The oppositely directed magnetic fields interact and cause the rotor 50 to rotate, thus, rotating the shaft 60. The shaft 60 is supported by a first bearing assembly 70 located opposite the drive end of the motor 10 and a second bearing assembly 80 located at the drive end of the motor 10.

During operation of the motor 10, heat is generated from core 30. The heat generated from the core 30 of the motor 10 heats the air inside the motor 10. The heated air has a deleterious effect on the efficient operation and life of the bearing assemblies 70 and 80. Therefore, a fan 225 is provided to cool the motor 10. The frame 20 is formed from cast iron or the like and can be molded as a single integral piece or assembled as multiple pieces. Depending upon the size of the motor 10, the frame 20 may or may not include a plurality of axially extending fins 90 substantially covering the frame 20. The fan 225 blows air across an integral field cup and end shield 100. The integral field cup and end shield 100 includes fins 450 (FIG. 4) that direct and channel air flow such that a laminar convective flow of air is blown across the motor frame 20, thus cooling the motor exterior and, ultimately, the motor core 30 and bearing assemblies 70 and 80.

Conventionally, circular end shields, also referred to as end bells or end brackets, are employed at both ends of a motor to support bearing assemblies and to enclose the electrical core. A modular brake is then added to the motor by mounting the brake to one of the circular end shields. This typically requires an additional mounting plate and some labor intensive modification to the end shield to accept the brake. In the present invention, however, the integral field cup and front end shield 100 is employed to integrate the motor 10 with a brake, thus removing the aforementioned disadvantages of the conventional system. The integral field cup and front end shield 100 is adapted to support the first bearing assembly 70 and a conventional circular end shield 110 supports the second bearing assembly 80. Both shields 100 and 110 are operable to enclose the stator 40 and rotor 50. Inner caps 120 and 130 are coupled to the end shields 100 and 110, respectively, and are employed to secure the bearings 70 and 80 in place. Alternatively, snap rings could be employed to secure the bearings 70 and 80 in place. In addition to acting as an end shield for the motor 10, the integral field cup and front end shield 100 acts as a field cup for the brake 15 mounted to the opposite drive end of the motor 10. Thus, another advantage of employing the integral field cup and front end shield 100 is that by combining a component of the motor 10 with a component of the brake 15 removes the need for a separate mounting plate, thus, reducing the overall cost, size, and weight of the motor and brake assembly.

The integral field cup and front end shield 100 is further adapted to house electromagnetic coils 150. Disposed above the electromagnetic coils 150 is a thin plate 160 operable to support at least one compression spring 170. An armature plate 180, a friction disk 190, and a stationary plate 200 are all positioned coaxially with the rotor shaft 60. The armature plate 180 is rotatably fixed. However, the armature plate 180 may axially slide within an air gap 210 in response to the force of the compression spring 170 or the pull of the electromagnetic coil 150. The fan 225 is affixed to the end of the shaft 60 outside the stationary plate 200. A cover 220 is positioned over the brake 15 and may be secured to the motor frame 20 and/or to the integral field cup and front end shield 100.

Figure 2:
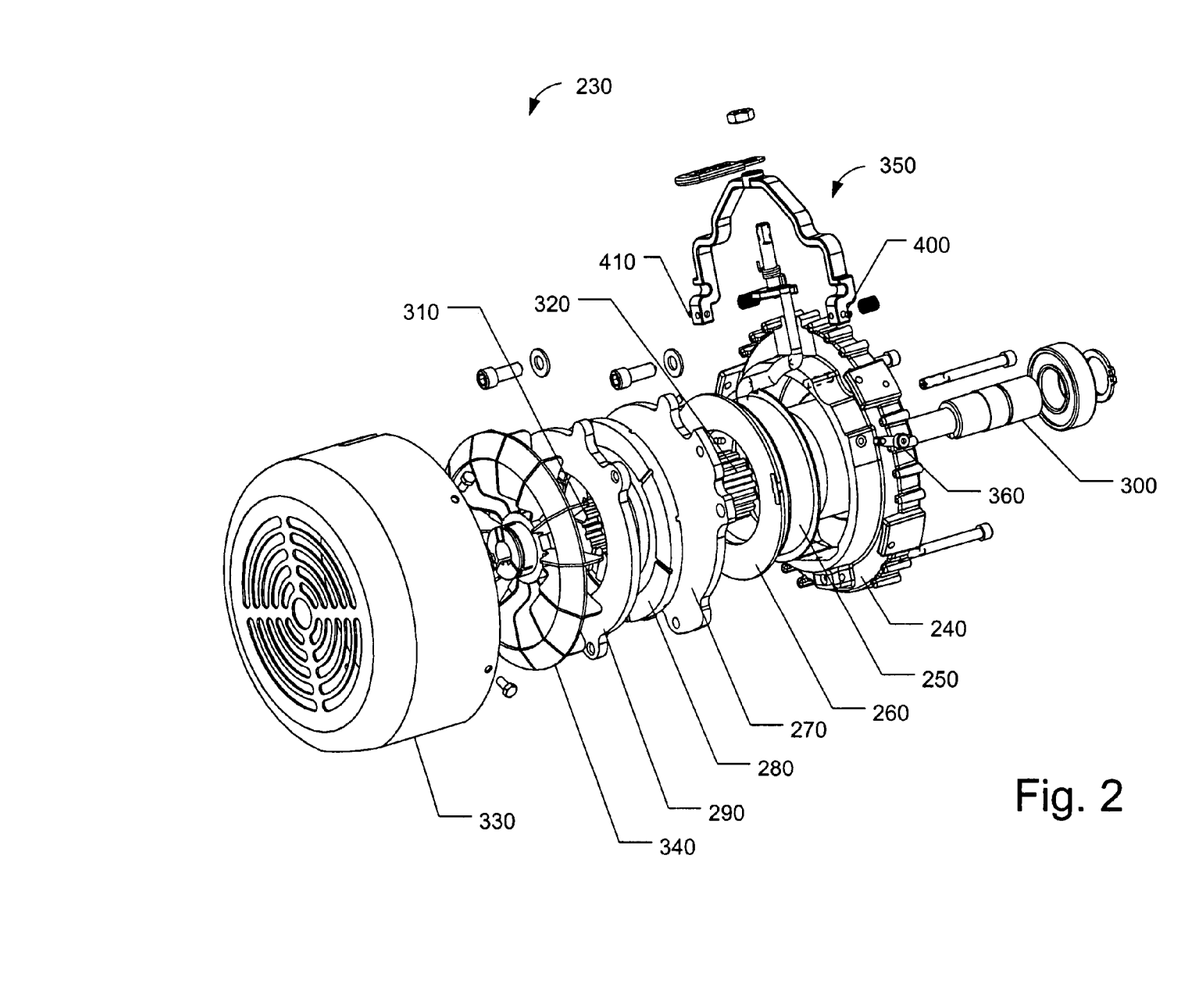
FIG. 2 illustrates an exploded view of an electric brake in accordance with one aspect of the present invention.
Figure 3:
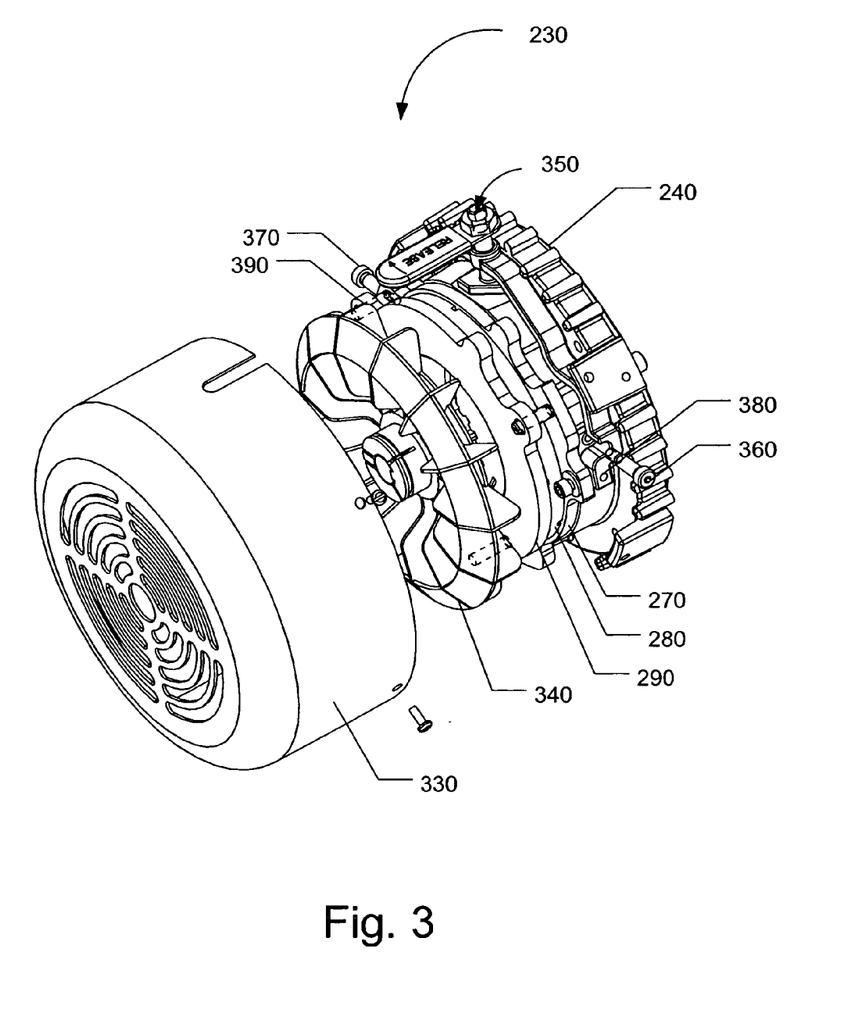
FIG. 3 illustrates a perspective view of an electric brake in accordance with one aspect of the present invention.

FIGS. 2–3 illustrate an example of an electromagnetic brake 230 in accordance with one aspect of the present invention. FIG. 2 illustrates an exploded view of the components of the electromagnetic brake assembly 230, while FIG. 3 illustrates the components generally assembled together. The electromagnetic brake assembly 230 includes an integral field cup and front end shield 240 disposed about a central longitudinal axis of the motor. The integral field cup and front end shield 240 functions as both an end shield for the motor and a field cup for the brake. An electromagnetic coil 250 is supported within the field cup portion of the integral field cup and front end shield 240 and is operable to electro-magnetize the field cup. The coil 250 comprises a winding of wires. As a voltage is applied to the coil 250, a magnetic force is created throughout the field cup 240. A thin plate 260 is disposed over the electromagnetic coil 250 to support at least one compression spring (not shown). The compression spring may be a wave spring and is employed to provide a force to hold an armature plate 270, a friction disk 280, and a stationary plate 290 tightly together. The armature plate 270 is coupled to the integral field cup and front end shield 240. The armature plate 270 is rotationally fixed about a rotor shaft 300 but is movable axially through an air gap (see FIG. 1). The stationary plate 290 is coupled to the armature plate 270 and is also rotationally fixed about the rotor shaft 300.

Disposed between the armature plate 270 and the stationary plate 290 is the friction disk 280. The friction disk 280 includes a splined inner periphery 310 adapted to engage a splined portion of a shaft 320. The shaft 320 is mechanically connected to either a drive motor or a load apparatus driven by the motor. The friction disk 280 is thus mounted on the splined portion of the shaft 320 and rotates with the splined shaft 320 in response to the motor or the load. When the brake 230 is engaged, the compression spring forces the armature plate 270 in an axial direction toward the friction disc 280. The spring has enough force to hold the friction disk 280 tightly between the armature plate 270 and the stationary plate 290 so as to prevent the friction disk 280 from rotating. Thus, the splined shaft 320 coupled to the friction disk 280 is also prevented from rotating and the motor is stopped. However, if a voltage is applied to the electromagnetic coil 250, the magnetic force operates to attract the armature plate 270 toward the field cup 240. As the armature plate 270 is pulled back against the field cup 240, it opens up an air gap between the armature plate 270 and the friction disc 280 and allows the friction disk 280 and thus the splined shaft 320 to rotate, thereby disengaging the brake 230.

Fan cooling assists in increasing the efficiency of a motor, thus, rotatably disposed on the shaft 300 of the motor is an internal fan 340. The fan 340 is employed to provide cooling air to both the brake 230 and the motor. In conventional systems, a shaft extension is coupled to a motor shaft and an internal fan is mounted onto the shaft extension. A shroud encases the fan and a modular brake is mounted to the back of the fan housing. Thus, the fan in the conventional system is positioned between the motor and the brake. This configuration provides no cooling to the brake. In the present invention, the fan 340 is positioned outside of the integral motor and brake system. Therefore, the brake 230 is also being cooled, improving the stopping and starting capacity of the brake 230. Additionally, the external periphery of the integral field cup and end shield 100 consists of radially extending fins 450 which act to direct a laminar convective flow of air from the fan 225 across the motor frame 20, thus providing improved motor cooling.

Coupled to both the integral field cup and front end shield 240 and the armature plate 270 is a manual brake release mechanism 350. The release mechanism 350 is operable to manually engage and disengage the brake 230 through the use of a lever and cam combination. The release mechanism 350 is employed during maintenance activities, in the event of a power failure, for testing purposes, and/or for any other reason one might desire to manually engage and/or disengage the brake 230. Two bolts 360 and 370 are provided in the integral field cup and front end shield 240 approximately 180-degrees apart from each other. The bolts 360 and 370 operate as pivot points for the brake release mechanism 350. The release mechanism 350 also contacts the armature plate 270 at two points 380 and 390 approximately 180-degrees apart. The armature plate 270 and the lever of the release mechanism 350 are coupled together at the two contact points 380 and 390 with adjustable connectors. As the friction disk 280 wears, setscrews 400 and 410 disposed within the release mechanism 350 are operable to adjust with the wear and account for increases in the air gap between the friction disk 280 and the armature plate 270. An aluminum shroud 330 is operable to cover and protect the brake assembly 230 from the environment. It is to be appreciated that by employing an integral field cup and front end shield, the number of parts on the brake assembly and motor are reduced, thus reducing the cost of the motor. Furthermore, by employing an integral field cup and front end shield, the orientation of the components of the brake assembly can be inverted, resulting in the reduction in the size of the brake assembly.

Figure 4:
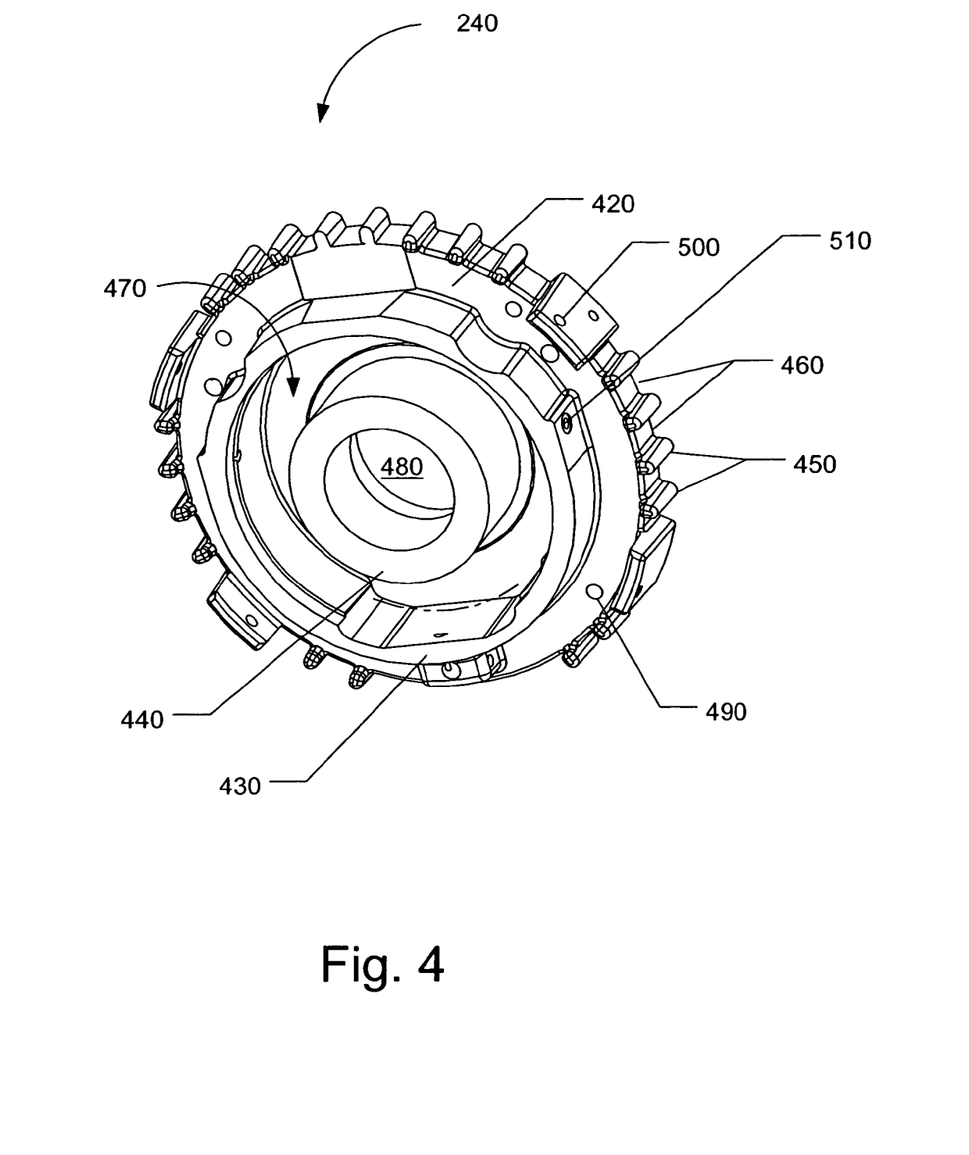
FIG. 4 illustrates a perspective view of an integral field cup and front end shield in accordance with one aspect of the present invention.

FIG. 4 illustrates the integrated field cup and front end shield 240 in accordance with one aspect of the present invention. The integrated field cup and front end shield 240 is adapted to be secured to the opposite drive end of the motor. In the present invention, the integrated field cup and front end shield 240 is shown as one piece that functions as both a field cup and an end shield. The integral field cup and front end shield 240 is formed of an annular flat portion 420 and two generally concentric ring-shaped extrusions 430 and 440. The annular flat portion 420 is adapted to mount to the opposite drive end of the motor and the armature plate 270 of the brake assembly 230. The annular flat portion 420 is further adapted to support a motor bearing assembly and enclose an electrical core within the motor. Substantially covering the circumference of the integral field cup and front end shield 240 are fins 450 similar to the fins substantially covering the frame of the motor. The integral field cup and front end shield fins 450 are likewise used to allow air to flow through channels 460 created by the fins 450, thereby providing cooling to the brake components, the motor core and the bearing assemblies. The two generally concentric ring-shaped extrusions 430 and 440 are located opposite the side utilized to secure the bearing assemblies. The inside of the first ring-shaped extrusion 430 and the outside of the second ring-shaped extrusion 440 form a cup-like portion 470 operable to house an electromagnetic coil. The inside of the second ring-shaped extrusion 440 forms a circular central opening 480 within the integrated field cup and front end shield 240, so that the shaft can extend there through. The integral field cup and front end shield 240 further includes apertures 490 for mounting to the opposite drive end of the motor, apertures 500 for mounting to the aluminum shroud 330, and apertures 510 for mounting the manual release mechanism 350.

Materials used to manufacture the integral field cup and front end shield 240 may include a ferromagnetic material, so that when a voltage is applied to the electric coil 250, the field cup becomes magnetized and attracts an armature plate 270. Thus, the armature plate 270 is also comprised of a ferromagnetic material. Furthermore, although the integral field cup and front end shield 240, as described, is generally one complete part, it is to be appreciated that the integral field cup and front end shield 240 may comprise two or more parts.

Figure 5:
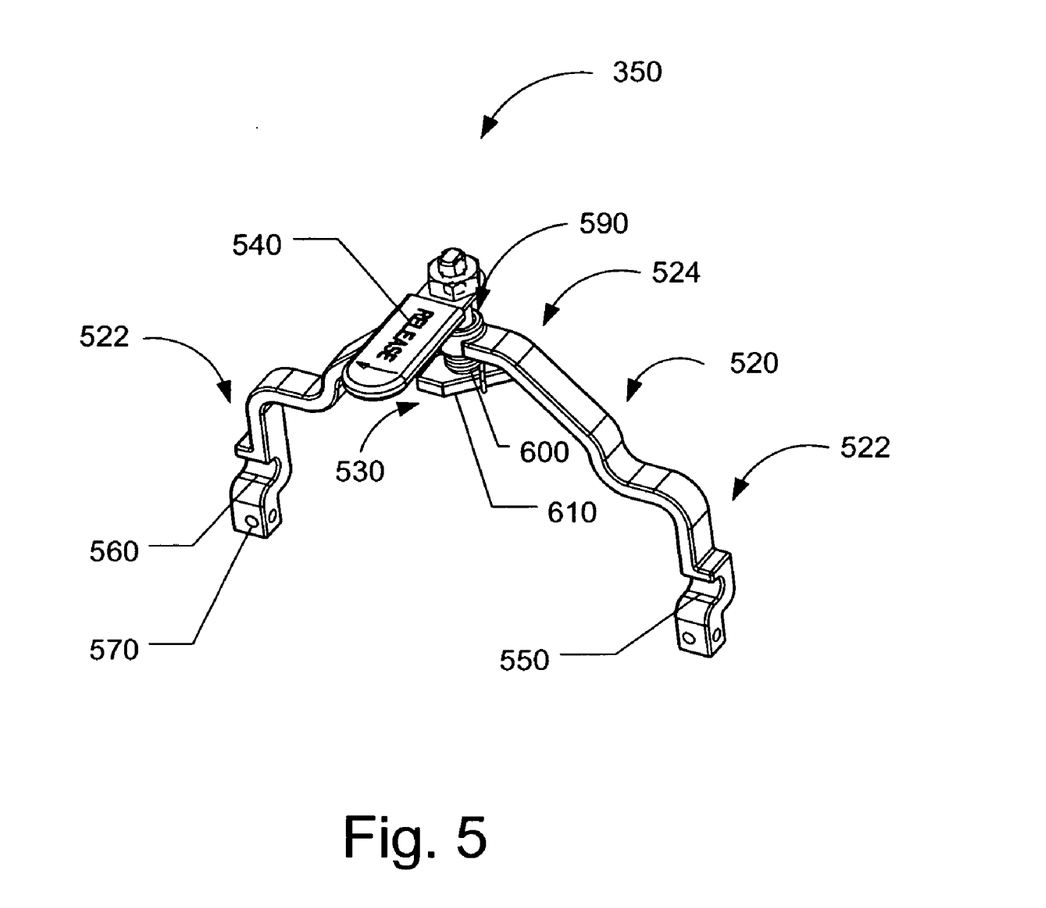
FIG. 5 illustrates a perspective view of a manual brake release mechanism in accordance with one aspect of the present invention.

FIG. 5 illustrates another aspect of the present invention. A system for an integrated electric motor and brake includes the manual release mechanism 350 for manually engaging and disengaging the brake. The manual release mechanism 350 includes a lever portion 520 and a cam portion 530. The lever portion 520 includes two generally L-shaped end portions 522 connected by a generally arcuate central portion 524. The lever portion 520 is adapted to surround the field cup, so that the cam portion 530 can rest on a surface of the field cup. Alternatively, the lever portion can be adapted to surround an end shield or an opposite drive end of a motor and provide the same basic function. The cam and lever combination are operable to pull the armature plate 270 towards the field cup, thereby disengaging the brake. A handle 540 is also included and may be covered with a vinyl material. As illustrated in FIG. 5 the handle 540 is labeled 'RELEASE' with an arrow indicating a direction in which to turn the handle.

The lever 520 of the brake release mechanism includes a generally semicircular notch 550 and 560 at respective end portions 522. The semicircular notches 550 and 560 are adapted to fit around the bolts 360 and 370, or pivot points, on the integral field cup and front end shield 240. When, the handle 540 is turned in the direction as indicated by the arrow, the cam portion 530 operates to tilt the central portion 524 of the lever 520, pivoting about the bolts 360 and 370. Because the pivot points 360 and 370 are spaced approximately 180-degrees apart, the release mechanism 350 creates an even pull over the circumference of the armature plate 270. The lever 520 tilts enough to sufficiently pull the armature plate 270 against the integral field cup and front end shield 240. Thus, the air gap between the armature plate 270 and the friction disk 280 is opened and the brake 230 is disengaged. The lever portion 520 of the manual release mechanism 350 also includes apertures 570 for mounting the manual release mechanism 350 to the armature plate 270.

The cam portion 530 of the manual release mechanism 350 is generally located at a midpoint position of the lever 520, which also facilitates the even pull over the circumference of the armature plate 270. A shaft portion 580 (see FIG. 8) of the cam extends through a circular opening 590 in the central portion 524 of the lever 520, which allows the cam 530 to rotate with respect to the lever 520. A torsional spring 600 is provided on the shaft portion 580 of the cam between the head 610 of the cam and the lever 520. The spring 600 allows the brake release mechanism 350 to easily return to its normal position when pressure is applied to the handle 540 in the opposite direction as indicated by the arrow.

Figure 6:
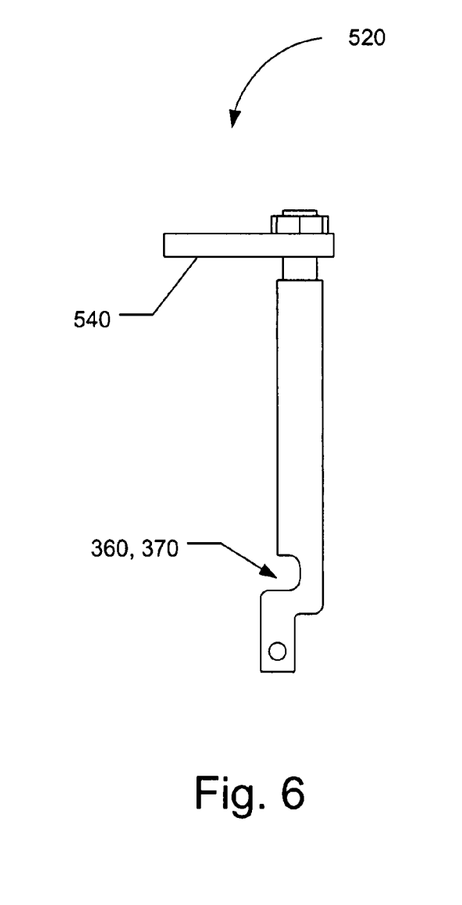
FIG. 6 illustrates a side view of a manual brake release mechanism in an unlocked position in accordance with one aspect of the present invention.
Figure 7:
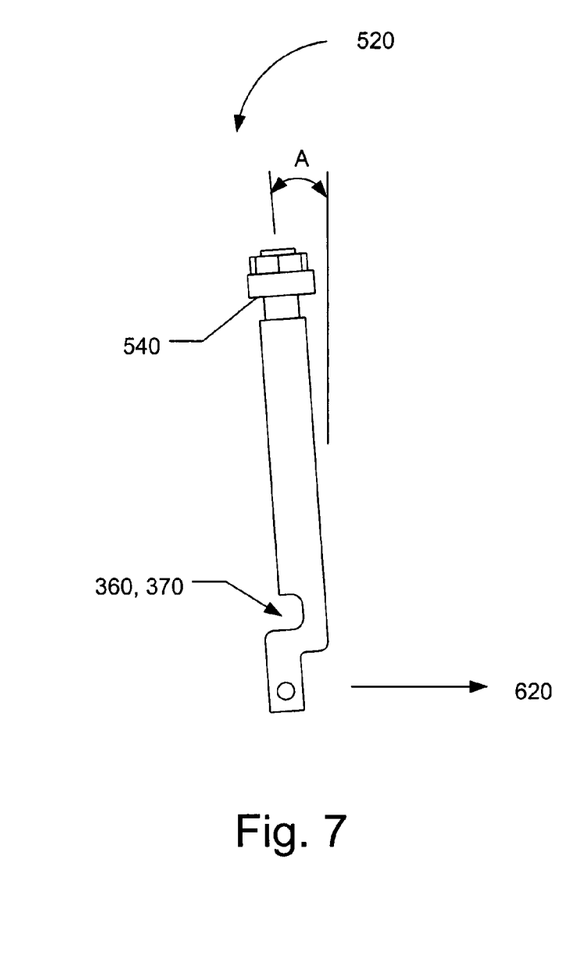
FIG. 7 illustrates a side view of a manual brake release mechanism in a locked position in accordance with one aspect of the present invention.

FIGS. 6–7 illustrate the lever portion 520 of the manual brake release mechanism 350 in accordance with the present invention. FIG. 6 illustrates a side view of the lever 520 in its normal, or unlocked, position, while FIG. 7 illustrates a side view of the lever 520 when employed to manually disengage the brake 230. When the manual brake release mechanism 350 is not employed, the lever portion 520 of the release mechanism 350 is positioned generally parallel with the armature plate 270. The handle 540 is positioned generally perpendicular to the lever 520. When the handle 540 is rotated, the cam (not shown) acts to pivot the lever portion 520 about a fulcrum point 360, 370, tilting the lever 520 at an angle A with respect to its original position. The angle A may be between 1-degree and 10-degrees, preferably about 4-degrees, to create a sufficient downward pull 620 at the ends of the lever. The ends of the lever are coupled to the armature plate 270, thereby pulling the armature plate 270 away from the friction disk 280. It is to be appreciated that the lever 520 may tilt any number of degrees necessary to pull the armature plate 270 apart from the friction plate 280 and disengage the brake 230.

Figure 8:
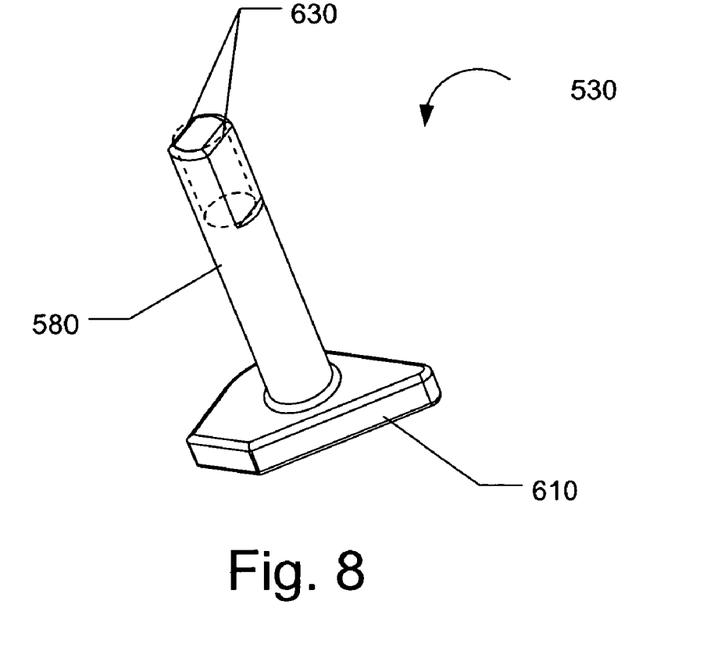
FIG. 8 illustrates a perspective view of a cam of a manual brake release mechanism in accordance with one aspect of the present invention.
Figure 9:
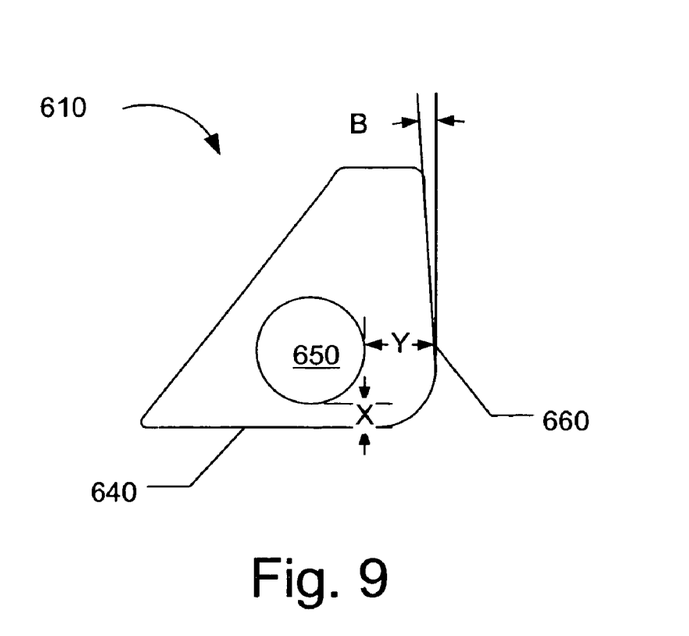
FIG. 9 illustrates a front view of a cam of a manual brake release mechanism in accordance with one aspect of the present invention.

FIGS. 8–9 illustrate the cam portion 530 of the manual release mechanism 350 in accordance with the present invention. The cam 530 includes a shaft portion 580 adapted to couple the cam 530 to the lever 520 and the handle 540 of the manual release mechanism 350. Two flat surfaces 630 are provided at one end of the shaft 580 to engage with a mating portion of the handle 540. Thus, the cam 530 is operable to rotate with the handle 540.

The design of the cam head 610 coupled with the torsion spring 600 allows rotation of the cam 530 in only one direction. When the manual release mechanism 350 is in its normal, unemployed state, the cam 530 rests on side 640. A distance of X resides between a central portion 650 of the release mechanism 350 and the surface of the integral field cup and front end shield 240 on which the head of the cam 610 rests. This distance X creates the generally parallel position shown in FIG. 6. When the manual release mechanism 350 is rotated to disengage the brake 230, the cam 610 rests on side 660. An angle B is incorporated into side 660 so that the cam 530 secures in place when rotated. Angle B may include an angle between 1-degrees and 8-degrees, preferably about 3-degrees. However, it is to be appreciated that any angle or no angle may be used on the side. The intersection between side 640 and side 660 is substantially rounded to allow for ease of rotation of the cam 530. Sides 640 and 660 are sufficiently long enough to provide a stable resting surface for the cam 530, thereby preventing any rattling problems. Furthermore, in this position, the distance Y between the central portion of the release mechanism 350 and the integral field cup and front end shield 240 increases, which creates the lever 520 to pivot about its pivot points 360 and 370 as described above. Moreover, angle A in FIG. 7 is dependent upon the increase in distance between X and Y. Materials used to manufacture the manual brake release mechanism 350 may include zinc die cast or any other material possessing sufficient strength and durability to perform the aforementioned functions.

Figure 10:
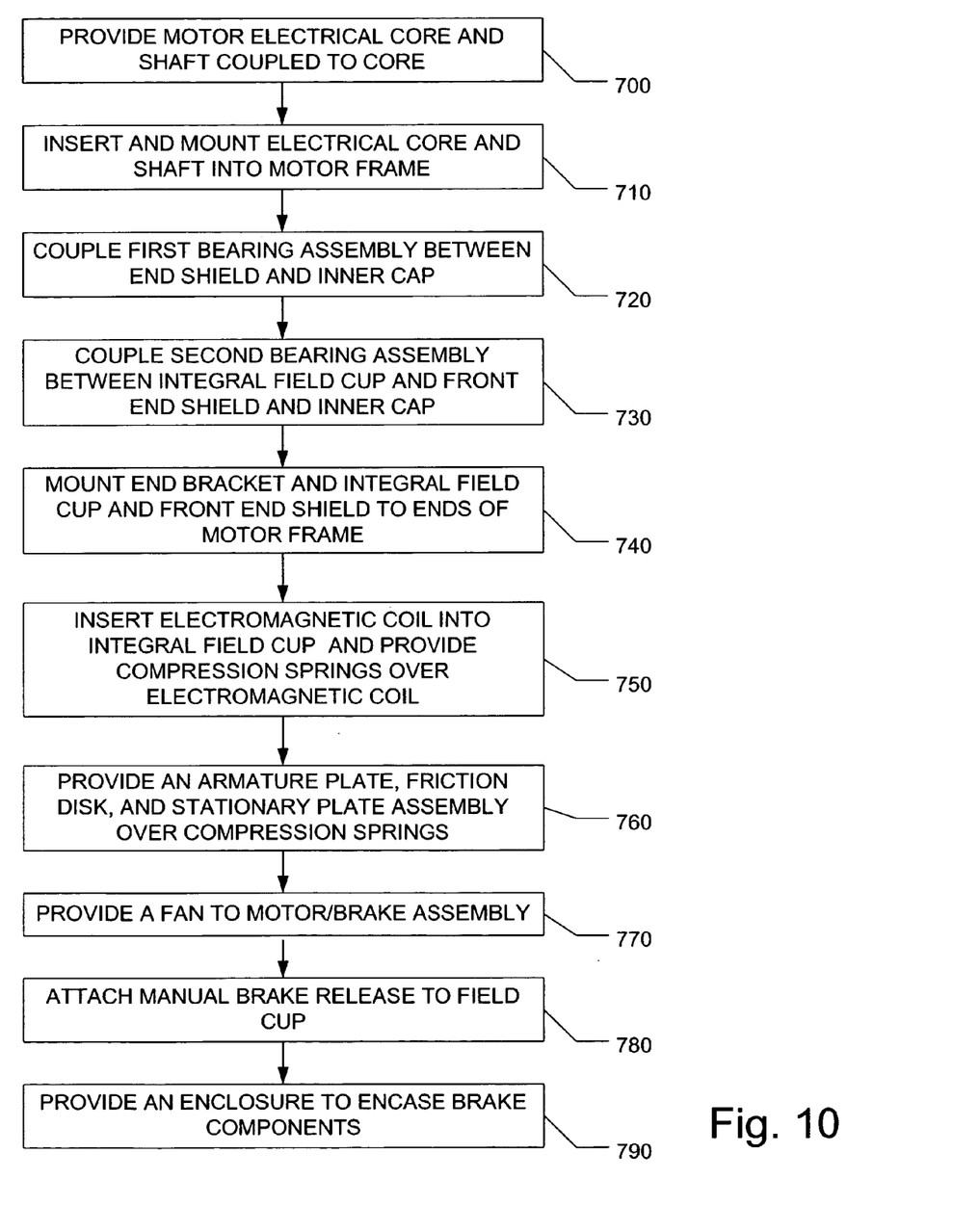
FIG. 10 illustrates a flow diagram of a methodology of manufacturing an electric motor with an electromagnetic brake in accordance with one aspect of the present invention.

In view of the foregoing structural and functional features described above, a methodology in accordance with various aspects of the present invention will be better appreciated with reference to FIG. 10. While, for purposes of simplicity of explanation, the methodology of FIG. 10 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 10 illustrates one particular methodology for fabricating an integrated electric motor and brake in accordance with an aspect of the present invention. The methodology begins at 700 where a motor electrical core coupled to a shaft is provided. The electrical core includes a stator and a rotor. At 710, the electrical core and shaft are inserted and mounted in a generally cylindrical frame to enclose the motor core and protect it from the environment. At 720, a first bearing assembly is disposed between an end shield and inner cap. At 730, a second bearing assembly is disposed between an integral field cup and front end shield and inner cap. The end shield and integral field cup and front end shield are provided to further enclose the motor from the environment. The methodology then proceeds to 740 where the end shield and integral field cup and front end shield are coupled to the motor frame. At 750, an electromagnetic coil is secured within the field cup portion of the integral field cup and front end shield and compression springs are provided to hold the brake in an engaged position. The methodology then proceeds to 760 where an armature plate, a friction disk, and a stationary plate are coupled together and further coupled to the integral field cup and front end shield. At 770, a fan is provided to supply the brake and the motor with cooling air and reduce heat produced by the brake and the electrical core. At 780, a manual brake release mechanism is attached to the field cup. At 790, an enclosure is provided to encase the brake components for environmental protection.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described components (systems, assemblies, systems, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several embodiments, such feature may be combined with one or more other features of the other embodiments, as may be desired and advantageous for any given or particular application. Furthermore, to the extent that the term "includes" is used in either the detailed description or the claims, such term is intended to be inclusive in a manner similar to the term "comprising".

What is claimed is:

1. An electronic brake system for an electronic motor, the electronic brake system having a manual brake release, comprising:
    a field cup adapted to support an electromagnetic coil;
    an armature plate coupled to the field cup;
    a stationary plate coupled to the armature plate;
    a friction disk disposed between the armature plate and the stationary plate;
    a compression spring disposed between the field cup and the armature plate, the compression spring being operable to hold the armature plate and the friction disk against the stationary plate; and
    a lever and cam assembly that comprises a cam mounted on a lever, coupled to the armature plate and the field cup, the cam abuts the field cup and is rotatable to push the cam and lever assembly off of an interior flat annular surface of the field cup to separate the armature plate from the friction disk.

2. The system of claim 1, the lever and cam assembly comprising a lever portion and a cam portion, the lever portion having a first and a second generally L-shaped end portion coupled to one another by a generally arcuate central portion, the lever portion being adapted to partially surround the field cup and coupled to the field cup at the first and second end portions, the cam portion being coupled to the lever portion at a central region of the arcuate central portion and being adapted to make contact with a surface of the field cup.

3. The system of claim 2, the lever portion being connected at a first and a second end to the field cup at a first and a second pivot point, the first and second pivot point being disposed approximately 180 degrees apart from each other, the lever portion being pivotable about the first and second pivot points in response to rotation of the earn portion resulting in tilting of the lever portion to pull the armature plate away from the friction disk and disengage the brake.

4. The system of claim 3, the lever portion of the lever and cam assembly tilting at an angle in the range of about 1 to 10 degrees.

5. The system of claim 4, the lever portion tilting at an angle of about 4 degrees.

6. The system of claim 3, further comprising a handle coupled to the cam portion, the handle being operable to rotate the cam portion.

7. The system of claim 6, the cam portion being adapted to allow the cam portion and handle to rotate between a first position and a second position.

8. The system of claim 4, the cam portion including a first position and a second position, the first position being operable to hold the lever and cam assembly in a disengaged position and the second position of the cam portion being operable to hold the lever and cam assembly in an engaged position.

9. The system of claim 8, the cam portion having a side with an angle incorporated therein, the angle being operable to hold the lever and cam assembly in the engaged position, the angle being in the range of about 1 to 8-degrees.

10. The system of cairn 9, the angle being about 3 degrees.

11. An electronic motor system having an electronic brake with a manual brake release, comprising:
    a motor portion surrounded by a frame;
    a field cup housing an electromagnetic coil and at least one compression spring, the field cup being coupled to the frame located at an opposite drive end of the motor;
    an armature plate coupled to the field cup;
    a stationary plate coupled to the armature plate;
    a friction disk disposed between the armature plate and the stationary plate, the compression spring being operable to hold the armature plate and the friction disk together; and
    a manual brake release coupled to a periphery of the field cup, the manual brake release comprises a lever and cam assembly that comprises a cam that is axially mounted on a lever, coupled to the armature plate and the field cup, the cam is rotatable to push the lever and cam assembly off of a flat annular surface of the field cup to separate the armature plate from the friction disk.

12. The system of claim 11, the lever and cam assembly comprising a lever portion and a cam portion, the lever portion having a first and a second generally L-shaped end portion coupled to one another by a generally arcuate central portion, the lever portion being adapted to partially surround the field cup and coupled to the field cup at the first and second end portions, the cam portion being coupled to the lever portion at a central region of the arcuate central portion and being adapted to make contact with a surface of the field cup.

13. The system of claim 12, the lever portion being connected at a first and a second end to the field cup at a first and a second pivot point, the first and second pivot point being disposed approximately 180-degrees apart from each other, the lever portion being pivotable about the first and second pivot points in response to rotation of the cam portion resulting in tilting of the lever portion to pull the armature plate away from the friction disk and disengage the brake.

14. The system of claim 13, the lever portion of the lever and cam assembly tilting at an angle in the range of about 1 to 10 degrees.

15. The system of claim 14, the lever portion tilting at an angle of about 4 degrees.

16. The system of claim 13, further comprising a handle coupled to the cam portion, the handle being operable to rotate the cam portion.

17. The system of claim 16, the cam portion being adapted to allow the cam portion and handle to rotate between a first position and a second position.

18. The system of claim 14, the cam portion including a first position and a second position, the first position being operable to hold the lever and cam assembly in a disengaged position and the second position of the cam portion being operable to hold the lever and cam assembly in an engaged position.

19. The system of claim 18, the cam portion having a side with an angle incorporated therein, the angle being operable to hold the lever and cam assembly in the engaged position, the angle being in the range of about 1 to 8 degrees.

20. The system of claim 19, the angle being about 3 degrees.

21. A method of fabricating an electronic brake system for an electronic motor, comprising:
   providing a field cup for supporting an electromagnetic coil;
   coupling an armature plate, friction disk, and stationary plate assembly to the field cup;
   providing at least one compression spring disposed between the field cup and armature plate, the at least one compression spring being operable to push the armature plate against the friction disk; and
   connecting a lever and cam assembly that comprises a cam mounted on a lever, to the field cup and the armature plate, the lever and cam assembly tilts as unit when the cam is turned to push the lever and cam assembly off of and away from a flat annular portion of the field cup to pull the armature plate away from the friction disk.

22. The method of claim 21, the lever and cam assembly comprising a lever portion and a cam portion, the lever portion having a first and a second generally L-shaped end portion coupled to one another by a generally arcuate central portion, the lever portion being adapted to partially surround the field cup.

23. The method of claim 21, the step of connecting the lever and cam assembly to the field cup comprising coupling the lever to the field cup at the first and second end portions and coupling the cam portion to the lever portion at a central region of the arcuate central portion such that the cam portion makes contact with a surface of the field cup.

24. The method of claim 23, the first and second pivot point being disposed approximately 180-degrees apart from each other such that the lever portion is pivotable about the first and second pivot points in response to rotation of the cam portion resulting in tilting of the lever portion to pull the armature plate away from the friction disk and disengage the brake.

25. The method of claim 24, further comprising coupling a handle to the cam portion, the handle being operable to rotate the cam portion between a first position and a second position.

26. The method of claim 24, the cam portion including a first position and a second position, the first position being operable to hold the lever and cam assembly in a disengaged position and the second position of the cam portion being operable to hold the lever and cam assembly in an engaged position.

27. An electronic brake system for an electronic motor, comprising:
   means for providing a field cup for supporting an electromagnetic coil:
   means for coupling an armature plate, friction disk, and stationary plate assembly to the field cup;
   means for providing at least one compression spring disposed between the field cup and armature plate, the at least one compression spring being operable to push the armature late against the friction disk; and
   means for connecting a lever and cam assembly that comprises a cam mounted on a lever, to the field cup and the armature plate, the lever and cam assembly tilts as unit when the cam is turned to push the lever and cam assembly off of and away from a flat annular portion of the field cup to pull the armature plate away from the friction disk.

* * * * *